(12) United States Patent
Tsai et al.

(10) Patent No.: US 10,113,912 B2
(45) Date of Patent: Oct. 30, 2018

(54) THERMOPILE MODULE

(71) Applicant: PIXART IMAGING INC., Hsin-Chu (TW)

(72) Inventors: Ming-Han Tsai, Hsin-Chu (TW); Chih-Ming Sun, Hsin-Chu (TW); Jian-Cheng Liao, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 325 days.

(21) Appl. No.: 14/972,563

(22) Filed: Dec. 17, 2015

(65) Prior Publication Data

US 2016/0349114 A1    Dec. 1, 2016

Related U.S. Application Data

(63) Continuation-in-part of application No. 14/726,472, filed on May 30, 2015.

(51) Int. Cl.
    *G01J 5/12*    (2006.01)
    *G01J 5/04*    (2006.01)
    *G01J 5/08*    (2006.01)
    *G01J 5/00*    (2006.01)

(52) U.S. Cl.
CPC ............ *G01J 5/048* (2013.01); *G01J 5/0025* (2013.01); *G01J 5/043* (2013.01); *G01J 5/0862* (2013.01); *G01J 5/0875* (2013.01); *G01J 5/12* (2013.01)

(58) Field of Classification Search
None
See application file for complete search history.

(56) References Cited

U.S. PATENT DOCUMENTS

| | | | |
|---|---|---|---|
| 2005/0156109 A1* | 7/2005 | Ludwig | G01J 5/10 250/338.1 |
| 2011/0175145 A1 | 7/2011 | Tsuji et al. | |
| 2012/0235038 A1 | 9/2012 | Nishikawa et al. | |
| 2015/0362365 A1 | 12/2015 | Fukunaka et al. | |

FOREIGN PATENT DOCUMENTS

| | | |
|---|---|---|
| TW | 201013892 A | 4/2010 |
| TW | 201129790 A | 9/2011 |
| TW | 201215857 A | 4/2012 |
| TW | 201440232 A | 10/2014 |

* cited by examiner

*Primary Examiner* — Edwin Gunberg
(74) *Attorney, Agent, or Firm* — Li & Cai Intellectual Property (USA) Office

(57) ABSTRACT

An electronic device includes an outer case, a circuit substrate, a thermopile sensor chip, a filter structure, and a waterproof structure. The outer case has an opening. The circuit substrate is disposed inside the outer case. The thermopile sensor chip is disposed on the circuit substrate. The filter structure is disposed above the thermopile sensor chip. The waterproof structure is surroundingly connected between the filter structure and the outer case for sealing up the opening of the outer case, wherein the waterproof structure has a through hole for exposing the filter structure and communicated with the opening of the outer case.

23 Claims, 9 Drawing Sheets

THERMOPILE MODULE

CROSS REFERENCE TO RELATED APPLICATION

This is a continuation-in-part application of U.S. application Ser. No. 14/726,472, filed on 30 May 2015 and entitled "WEARABLE DEVICE WITH COMBINED SENSING CAPABILITIES", now pending, the entire disclosures of which are incorporated herein by reference.

BACKGROUND OF THE INVENTION

1. Field of the Invention

The instant disclosure relates to a thermopile module; in particular, to a thermopile module which can be used in wearable devices for detecting infrared temperature.

2. Description of Related Art

A thermopile module in a wearable device is used for detecting infrared temperature generated from an ambient environment or an object surface (e.g., skin or finger). However, the wearable devices including the thermopile module of prior arts are not waterproof, such that these kinds of wearable devices of the prior arts are liable to get rusty and damaged due to moisture.

SUMMARY OF THE INVENTION

In order to overcome the abovementioned problem, this instant disclosure provides a thermopile module used in a wearable device for measuring infrared temperature, and the thermopile module has waterproof function to prevent the wearable device getting rusty due to moisture.

To achieve the abovementioned purpose, one of the embodiments of this instant disclosure provides a thermopile module which includes an outer case, a circuit substrate, a sensor chip, a filter structure, and a waterproof structure. The outer case has an opening. The circuit substrate is disposed inside the outer case. The sensor chip is disposed on the circuit substrate. The filter structure is disposed above the sensor chip. The waterproof structure is surroundingly connected between the filter structure and the outer case for sealing up the opening of the outer case, wherein the waterproof structure has a through hole for exposing the filter structure and communicated with the opening of the outer case.

Another embodiment of this instant disclosure provides a thermopile module which includes an outer case, a circuit substrate, a sensor chip, and a waterproof structure. The outer case has an opening. The circuit substrate is disposed inside the outer case. The sensor chip is disposed on the circuit substrate. The waterproof structure is disposed on the outer case for sealing up the opening of the outer case.

This instant disclosure has the benefit that, the thermopile module of this instant disclosure has small size which can be used in a wearable device and for measuring infrared temperature generated from an ambient environment or an object surface (e.g., skin or finger), and the thermopile module includes a waterproof structure to avoid water getting into the thermopile module, so as to prevent the wearable device getting rusty due to moisture.

In order to further appreciate the characteristics and technical contents of the present invention, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Embodiments of thermopile module disclosed in the instant disclosure are illustrated via specific examples as follows, and people familiar in the art may easily understand the advantages and efficacies of the instant disclosure by disclosure of the specification. The instant disclosure may be implemented or applied by other different specific examples, and each of the details in the specification may be applied based on different views and may be modified and changed under the existence of the spirit of the instant disclosure. The figures in the instant disclosure are only for brief description, but they are not depicted according to actual size and do not reflect the actual size of the relevant structure. The following embodiments further illustrate related technologies of the instant disclosure in detail, but the scope of the instant disclosure is not limited herein.

First Embodiment

Figure 1:
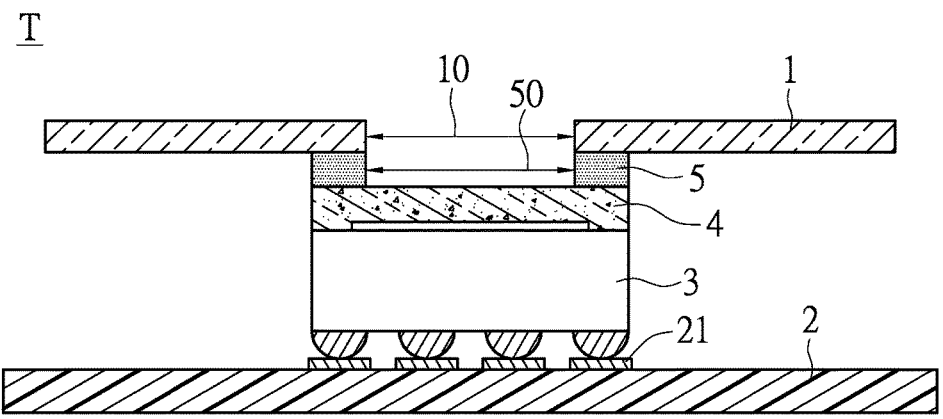
FIG. 1 shows a schematic view of a thermopile module of a first embodiment in the instant disclosure.

Please refer to FIG. 1. FIG. 1 shows a schematic view of an electronic device T of a first embodiment in the instant disclosure. The electronic device T of the first embodiment in the instant disclosure includes an outer case 1, a circuit substrate 2, a thermopile sensor chip 3, a filter structure 4, and a waterproof structure 5. The outer case 1 has an opening 10. The circuit substrate 2 is disposed inside the outer case 1. The thermopile sensor chip 3 is disposed on the circuit substrate 2. The filter structure 4 is disposed above the thermopile sensor chip 3. The waterproof structure 5 is surroundingly connected between the filter structure 4 and the outer case 1 for sealing up the opening 10 of the outer case 1, wherein the waterproof structure 5 has a through hole 50 for exposing the filter structure 4 and communicated with the opening 10 of the outer case 1.

Figure 6:
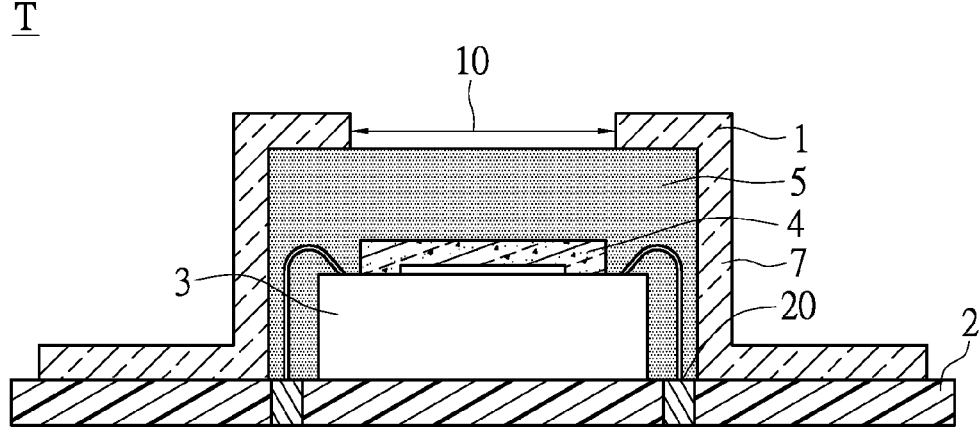
FIG. 6 shows a schematic view of a thermopile module of a sixth embodiment in the instant disclosure.

The thermopile sensor chip 3 of the electronic device T is electrically connected to the circuit substrate 2 by wire-bonding 20 (as shown in FIG. 6) or flip-chip bonding 21 (as shown in FIG. 1).

When skin or finger touches the outer case 1 of the electronic device T, an infrared heat energy generated from the skin or finger passes into the electronic device T through the opening 10 of the outer case 1, the filter structure 4 only receives an infrared wave generated from the skin or finger passing through and reflects other waves, the thermopile sensor chip 3 receives the filtered infrared heat, and the infrared temperature is then obtained. That is to say, when a user touches the outer case 1 of the electronic device, the electronic device will show the human's body temperature.

Second Embodiment

Figure 2:
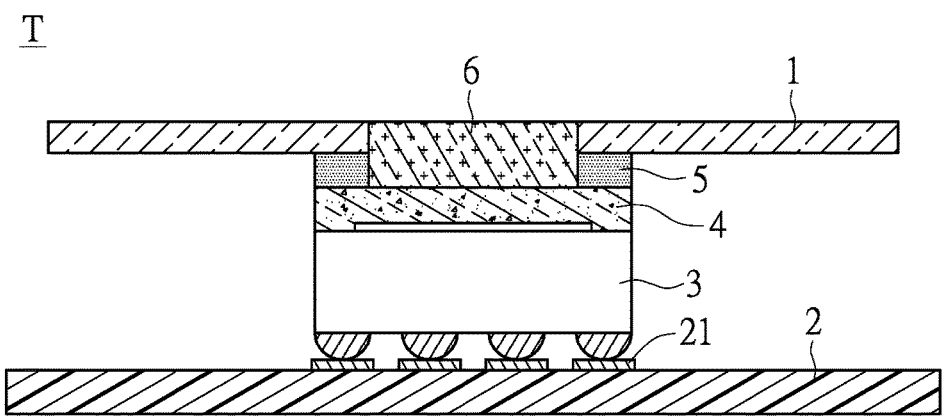
FIG. 2 shows a schematic view of a thermopile module of a second embodiment in the instant disclosure.

Please refer to FIG. 2. FIG. 2 shows a schematic view of an electronic device T of a second embodiment in the instant disclosure. The structure of the electronic device T of the second embodiment in the instant disclosure is similar to that of the first embodiment in the instant disclosure.

The electronic device T of the second embodiment in the instant disclosure includes an outer case 1, a circuit substrate 2, a thermopile sensor chip 3, a filter structure 4, and a waterproof structure 5. The outer case 1 has an opening 10. The circuit substrate 2 is disposed inside the outer case 1. The thermopile sensor chip 3 is disposed on the circuit substrate 2. The filter structure 4 is disposed above the thermopile sensor chip 3. The waterproof structure 5 is surroundingly connected between the filter structure 4 and the outer case 1 for sealing up the opening 10 of the outer case 1, wherein the waterproof structure 5 has a through hole 50 for exposing the filter structure 4 and communicated with the opening 10 of the outer case 1.

The difference between the second embodiment and the first embodiment in this instant disclosure is that, the opening 10 of the outer case 1 and the through hole 50 of the waterproof structure 5 are filled with an infrared passing glue 6. The infrared passing glue 6 is made from a transparent material, when the infrared passing glue 6 is solidified, the infrared passing glue 6 is integrated with the electronic device T, and the infrared passing glue 6 can let an infrared heat energy generated from an ambient environment or an object surface (e.g., skin or finger) passes therethrough. In addition, since the infrared passing glue 6 is integrated with the electronic device T, which can prevent water and dust getting into the electronic device T.

Specifically, when skin or finger touches the infrared passing glue 6 of the outer case 1 of the electronic device T, the infrared heat energy generated from the skin or finger passes into the electronic device T through the infrared passing glue 6, the filter structure 4 only receives the infrared wave generated from the skin or finger passing through and reflects other waves, the thermopile sensor chip 3 receives the filtered infrared heat, and the infrared temperature is then obtained.

Third Embodiment

Figure 3:
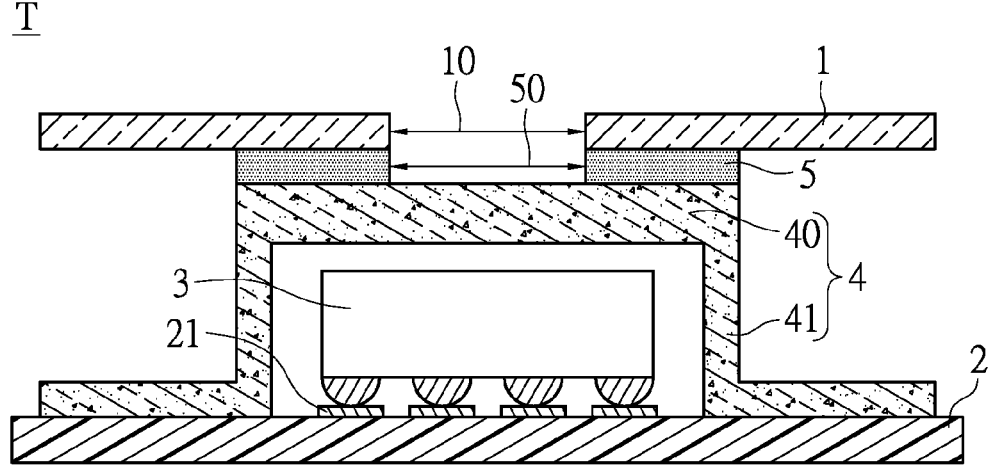
FIG. 3 shows a schematic view of a thermopile module of a third embodiment in the instant disclosure.

Please refer to FIG. 3. FIG. 3 shows a schematic view of a thermopile module of a third embodiment in the instant disclosure. The structure of the electronic device T of the third embodiment in the instant disclosure is similar to that of the first embodiment in the instant disclosure.

The electronic device T of the third embodiment in the instant disclosure includes an outer case 1, a circuit substrate 2, a thermopile sensor chip 3, a filter structure 4, and a waterproof structure 5. The outer case 1 has an opening 10. The circuit substrate 2 is disposed inside the outer case 1. The thermopile sensor chip 3 is disposed on the circuit substrate 2. The filter structure 4 is disposed above the thermopile sensor chip 3. The waterproof structure 5 is surroundingly connected between the filter structure 4 and the outer case 1 for sealing up the opening 10 of the outer case 1, wherein the waterproof structure 5 has a through hole 50 for exposing the filter structure 4 and communicated with the opening 10 of the outer case 1.

The difference between the third embodiment and the first embodiment in this instant disclosure is that, the filter structure 4 has a filter covering portion 40 and a filter supporting portion 41, the filter covering portion 40 is disposed above the thermopile sensor chip 3 and connected to the waterproof structure 5, and the filter supporting portion 41 is extended downwardly from the filter covering portion 40 to contact the circuit substrate 2 for supporting the filter covering portion 40.

Specifically, when skin or finger touches the outer case 1 of the electronic device T, an infrared heat energy generated from the skin or finger passes into the electronic device T through the opening 10 of the outer case 1, the filter structure 4 only receives an infrared wave generated from the skin or finger passing through and reflects other waves, the thermopile sensor chip 3 receives the filtered infrared heat, and the infrared temperature is then obtained.

Fourth Embodiment

Figure 4:
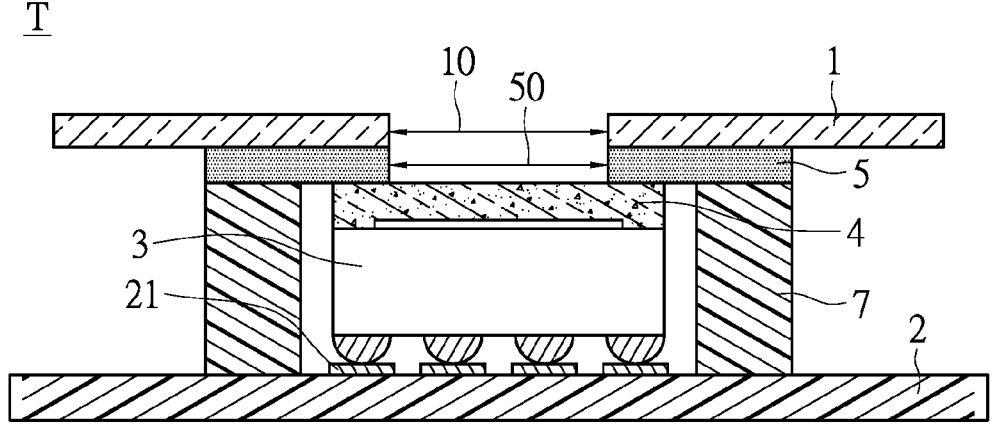
FIG. 4 shows a schematic view of a thermopile module of a fourth embodiment in the instant disclosure.

Please refer to FIG. 4. FIG. 4 shows a schematic view of an electronic device T of a fourth embodiment in the instant disclosure. The structure of the electronic device T of the fourth embodiment in the instant disclosure is similar to that of the first embodiment in the instant disclosure.

The electronic device T of the fourth embodiment in the instant disclosure includes an outer case 1, a circuit substrate 2, a thermopile sensor chip 3, a filter structure 4, and a waterproof structure 5. The outer case 1 has an opening 10. The circuit substrate 2 is disposed inside the outer case 1. The thermopile sensor chip 3 is disposed on the circuit substrate 2. The filter structure 4 is disposed above the thermopile sensor chip 3. The waterproof structure 5 is surroundingly connected between the filter structure 4 and the outer case 1 for sealing up the opening 10 of the outer case 1, wherein the waterproof structure 5 has a through hole 50 for exposing the filter structure 4 and communicated with the opening 10 of the outer case 1.

The difference between the fourth embodiment and the first embodiment in this instant disclosure is that, the electronic device T further includes a support structure 7 disposed between the circuit substrate 2 and the waterproof structure 5 for supporting the waterproof structure 5.

Specifically, when skin or finger touches the outer case 1 of the electronic device T, an infrared heat energy generated from the skin or finger passes into the electronic device T through the opening 10 of the outer case 1, the filter structure 4 only receives an infrared wave generated from the skin or finger passing through and reflects other waves, the thermopile sensor chip 3 receives the filtered infrared heat, and the infrared temperature is then obtained.

Fifth Embodiment

Figure 5:
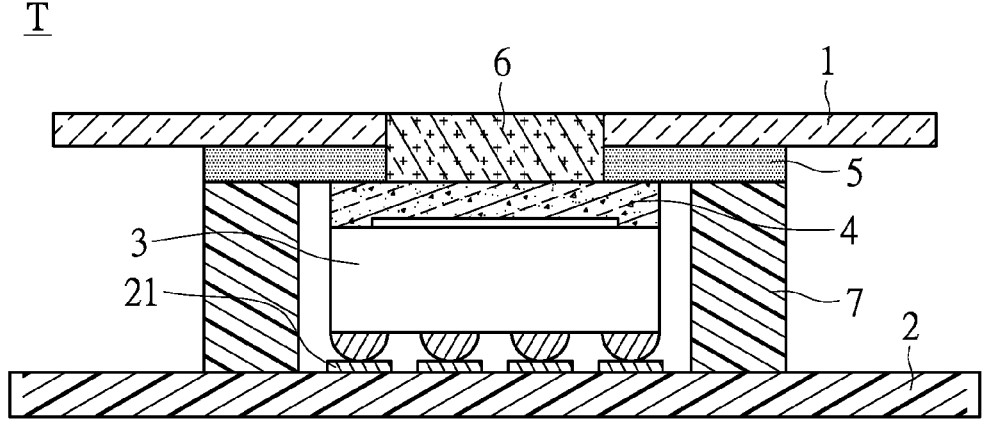
FIG. 5 shows a schematic view of a thermopile module of a fifth embodiment in the instant disclosure.

Please refer to FIG. 5. FIG. 5 shows a schematic view of an electronic device T of a fifth embodiment in the instant disclosure. The structure of the electronic device T of the fifth embodiment in the instant disclosure is similar to that of the fourth embodiment in the instant disclosure.

The electronic device T of the fifth embodiment in the instant disclosure includes an outer case 1, a circuit substrate 2, a thermopile sensor chip 3, a filter structure 4, a waterproof structure 5, and a support structure 7. The outer case 1 has an opening 10. The circuit substrate 2 is disposed inside the outer case 1. The thermopile sensor chip 3 is disposed on the circuit substrate 2. The filter structure 4 is disposed above the thermopile sensor chip 3. The waterproof structure 5 is surroundingly connected between the filter structure 4 and the outer case 1 for sealing up the opening 10 of the outer case 1, wherein the waterproof structure 5 has a through hole 50 for exposing the filter structure 4 and communicated with the opening 10 of the outer case 1. The support structure 7 is disposed between the circuit substrate 2 and the waterproof structure 5 for supporting the waterproof structure 5.

The difference between the fifth embodiment and the fourth embodiment in this instant disclosure is that, the opening 10 of the outer case 1 and the through hole 50 of the waterproof structure 5 are filled with an infrared passing glue 6. The infrared passing glue 6 is made from a transparent material, when the infrared passing glue 6 is solidified, the infrared passing glue 6 is integrated with the electronic device T, and the infrared passing glue 6 can let an infrared heat energy generated from an ambient environment or an object surface (e.g., skin or finger) passes therethrough. In addition, since the infrared passing glue 6 is integrated with the electronic device T, which can prevent water and dust getting into the electronic device T.

Specifically, when skin or finger touches the infrared passing glue 6 of the outer case 1 of the electronic device T, the infrared heat energy generated from the skin or finger passes into the electronic device T through the infrared passing glue 6, the filter structure 4 only receives the infrared wave generated from the skin or finger passing through and reflects other waves, the thermopile sensor chip 3 receives the filtered infrared heat, and the infrared temperature is then obtained.

Sixth Embodiment

Please refer to FIG. 6. FIG. 6 shows a schematic view of an electronic device T of a sixth embodiment in the instant disclosure. The structure of the electronic device T of the sixth embodiment in the instant disclosure is similar to that of the fourth embodiment in the instant disclosure.

The electronic device T of the sixth embodiment in the instant disclosure includes an outer case 1, a circuit substrate 2, a thermopile sensor chip 3, a filter structure 4, a waterproof structure 5, and a support structure 7. The outer case 1 has an opening 10. The circuit substrate 2 is disposed inside the outer case 1. The thermopile sensor chip 3 is disposed on the circuit substrate 2. The filter structure 4 is disposed above the thermopile sensor chip 3. The waterproof structure 5 is surroundingly connected between the filter structure 4 and the outer case 1 for sealing up the opening 10 of the outer case 1.

The difference between the sixth embodiment and the fourth embodiment in this instant disclosure is that, the waterproof structure 5 is disposed on the circuit substrate 2 for encapsulating the thermopile sensor chip 3 and the filter structure 4, and the support structure 7 is disposed between the circuit substrate 2 and the outer case 1 for supporting the outer case 1. Since the thermopile sensor chip 3 and the filter structure 4 are completely covered by the waterproof structure 5, which can prevent the moisture or particles getting into the electronic device T. In addition, the material of waterproof structure 5 is transparent, such that the infrared can pass therethrough. Since the waterproof structure 5 is encapsulated filled in the electronic device T, it can prevent water and dust getting into the electronic device T.

Specifically, when skin or finger touches the outer case 1 of the electronic device T, an infrared heat energy generated from the skin or finger passes into the electronic device T through the opening 10 of the outer case 1, the filter structure 4 only receives an infrared wave generated from the skin or finger passing through and reflects other waves, the thermopile sensor chip 3 receives the filtered infrared heat, and the infrared temperature is then obtained.

Seventh Embodiment

Figure 7:
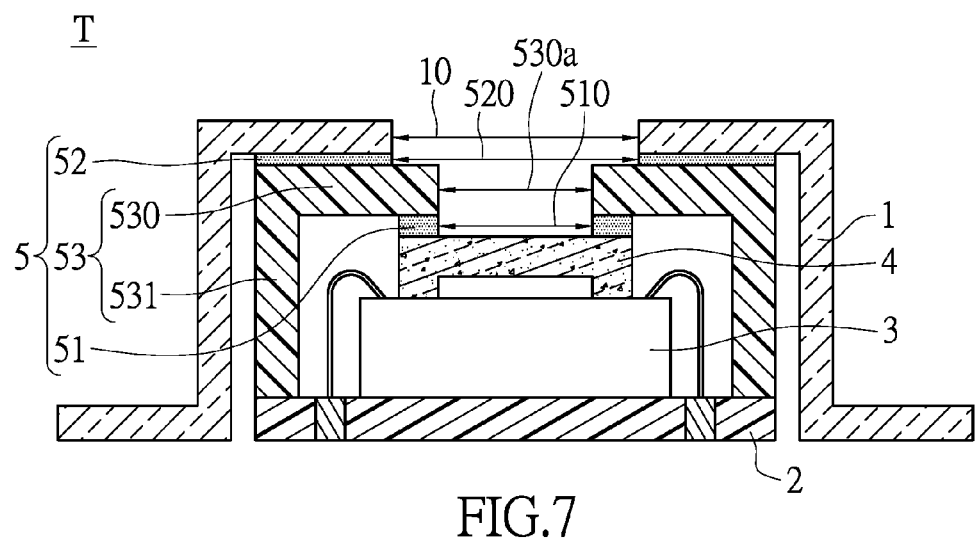
FIG. 7 shows a schematic view of a thermopile module of a seventh embodiment in the instant disclosure.

Please refer to FIG. 7. FIG. 7 shows a schematic view of an electronic device T of a seventh embodiment in the instant disclosure. The structure of the electronic device T of the seventh embodiment in the instant disclosure is similar to that of the first embodiment in the instant disclosure.

The electronic device T of the seventh embodiment in the instant disclosure includes an outer case 1, a circuit substrate 2, a thermopile sensor chip 3, a filter structure 4, and a waterproof structure 5. The outer case 1 has an opening 10. The circuit substrate 2 is disposed inside the outer case 1. The thermopile sensor chip 3 is disposed on the circuit substrate 2. The filter structure 4 is disposed above the thermopile sensor chip 3. The waterproof structure 5 is disposed on the circuit substrate 2 for encapsulating the thermopile sensor chip 3 and the filter structure 4. Since the thermopile sensor chip 3 and the filter structure 4 are covered by the waterproof structure 5, which can prevent the moisture or particles getting into the electronic device T.

The difference between the seventh embodiment and the first embodiment in this instant disclosure is that, the waterproof structure 5 includes a first waterproofing element 51, a second waterproofing element 52, and a support structure 53, the first waterproofing element 51 is surroundingly connected onto the filter structure 4, the second waterproofing element 52 is surroundingly connected onto the outer case 1, the support structure 53 is disposed between the first waterproofing element 51 and the second waterproofing element 52, and the support structure 53 has a first support portion 530 connected between the first waterproofing element 51 and the second waterproofing element 52 and a second support portion 531 extended downwardly from the first support portion 530 to contact the circuit substrate 2 for supporting the second waterproofing element 52. Furthermore, the first waterproofing element 51 has a first through hole 510, the second waterproofing element 52 has a second through hole 520 communicated with the opening 10 of the outer case 1, and the first support portion 530 has a third through hole 530a communicated between the first through hole 510 and the second through hole 520.

When skin or finger touches the outer case 1 of the electronic device T, an infrared heat energy generated from the skin or finger passes into the electronic device T through the opening 10 of the outer case 1, the filter structure 4 only receives an infrared wave generated from the skin or finger passing through and reflects other waves, the thermopile sensor chip 3 receives the filtered infrared heat, and the infrared temperature is then obtained.

Eighth Embodiment

Figure 8:
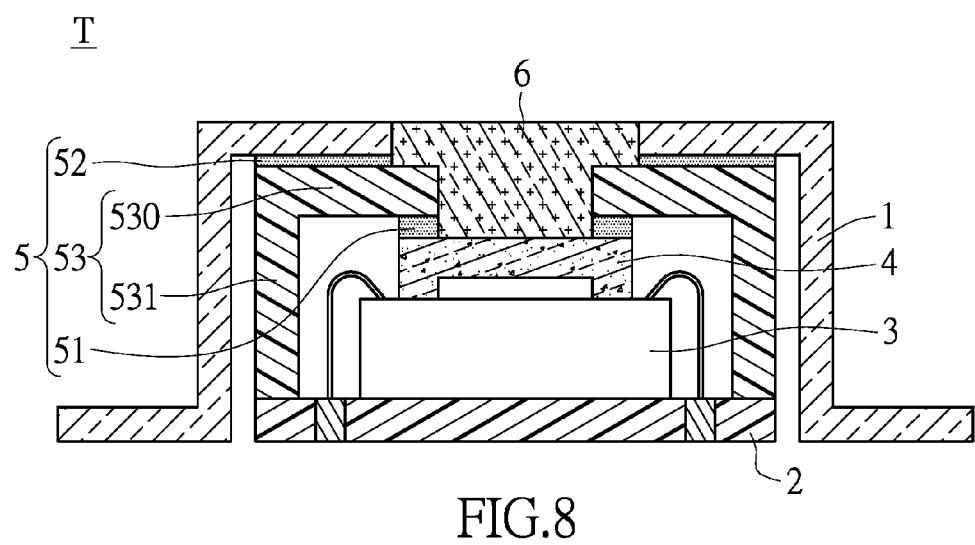
FIG. 8 shows a schematic view of a thermopile module of an eighth embodiment in the instant disclosure.

Please refer to FIG. 8. FIG. 8 shows a schematic view of an electronic device T of an eighth embodiment in the instant disclosure. The structure of the electronic device T of the eighth embodiment in the instant disclosure is similar to that of the seventh embodiment in the instant disclosure.

The electronic device T of the eighth embodiment in the instant disclosure includes an outer case 1, a circuit substrate 2, a thermopile sensor chip 3, a filter structure 4, and a waterproof structure 5. The outer case 1 has an opening 10. The circuit substrate 2 is disposed inside the outer case 1. The thermopile sensor chip 3 is disposed on the circuit substrate 2. The filter structure 4 is disposed above the thermopile sensor chip 3. The waterproof structure 5 is disposed on the circuit substrate 2 for encapsulating the thermopile sensor chip 3 and the filter structure 4, wherein the waterproof structure 5 includes a first waterproofing element 51, a second waterproofing element 52, and a support structure 53. The first waterproofing element 51 is surroundingly connected onto the filter structure 4, the second waterproofing element 52 is surroundingly connected onto the outer case 1, and the support structure 53 is disposed between the first waterproofing element 51 and the second waterproofing element 52, wherein the support structure 53 has a first support portion 530 connected between the first waterproofing element 51 and the second waterproofing element 52 and a second support portion 531 extended downwardly from the first support portion 530 to contact the circuit substrate 2 for supporting the second waterproofing element. The first waterproofing element 51 has a first through hole 510, the second waterproofing element 52 has a second through hole 520 communicated with the opening 10 of the outer case 1, and the first support portion 530 has a third through hole 530a communicated between the first through hole 510 and the second through hole 520. Since the thermopile sensor chip 3 and the filter structure 4 are completely covered by the waterproof structure 5, which can prevent the moisture or particles getting into the electronic device T.

The difference between the eighth embodiment and the seventh embodiment in this instant disclosure is that, the opening 10 of the outer case 1 and the first, the second, and the third through holes 510, 520, 530a of the waterproof structure 5 are filled with an infrared passing glue 6. The infrared passing glue 6 is made from a transparent material, when the infrared passing glue 6 is solidified, the infrared passing glue 6 is integrated with the electronic device T, and the infrared passing glue 6 can let an infrared heat energy generated from an ambient environment or an object surface (e.g., skin or finger) passes therethrough. In addition, since the infrared passing glue 6 is integrated with the electronic device T, which can prevent water and dust getting into the electronic device T.

Specifically, when skin or finger touches the infrared passing glue 6 of the outer case 1 of the electronic device T, the infrared heat energy generated from the skin or finger passes into the electronic device T through the infrared passing glue 6, the filter structure 4 only receives the infrared wave generated from the skin or finger passing through and reflects other waves, the thermopile sensor chip 3 receives the filtered infrared heat, and the infrared temperature is then obtained.

Ninth Embodiment

Figure 9:
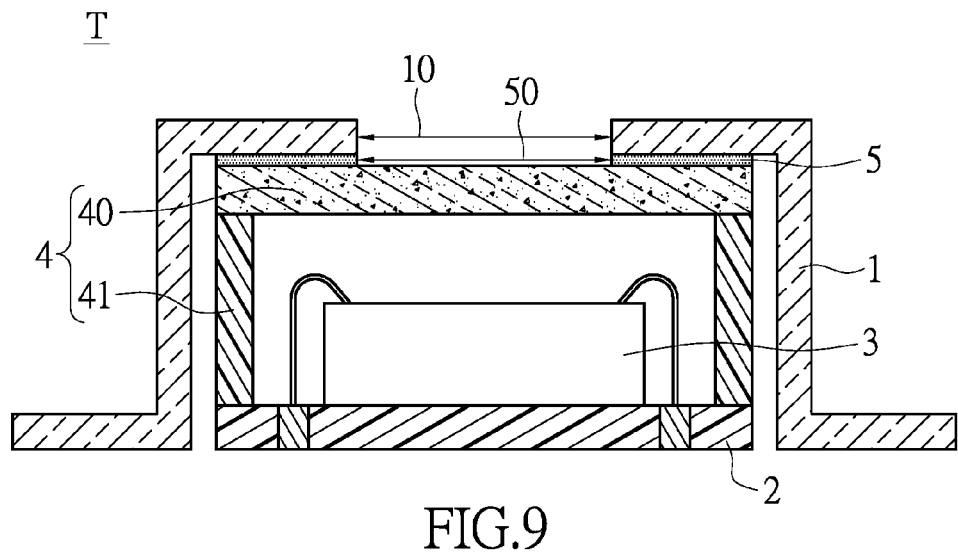
FIG. 9 shows a schematic view of a thermopile module of a ninth embodiment in the instant disclosure.

Please refer to FIG. 9. FIG. 9 shows a schematic view of an electronic device T of a ninth embodiment in the instant disclosure. The structure of the electronic device T of the ninth embodiment in the instant disclosure is similar to that of the third embodiment in the instant disclosure.

The electronic device T of the ninth embodiment in the instant disclosure includes an outer case 1, a circuit substrate 2, a thermopile sensor chip 3, a filter structure 4, and a waterproof structure 5. The outer case 1 has an opening 10. The circuit substrate 2 is disposed inside the outer case 1. The thermopile sensor chip 3 is disposed on the circuit substrate 2. The filter structure 4 is disposed above the thermopile sensor chip 3. The filter structure 4 has a filter covering portion 40 and a filter supporting portion 41, the filter covering portion 40 is disposed above the thermopile sensor chip 3 and connected to the waterproof structure 5, and the filter supporting portion 41 is extended downwardly from the filter covering portion 40 to contact the circuit substrate 2 for supporting the filter covering portion 40. The waterproof structure 5 is surroundingly connected between the filter structure 4 and the outer case 1 for sealing up the opening 10 of the outer case 1, wherein the waterproof structure 5 has a through hole 50 for exposing the filter structure 4 and communicated with the opening 10 of the outer case 1.

The difference between the ninth embodiment and the third embodiment in this instant disclosure is that, the filter covering portion 40 is suspend above the thermopile sensor chip 3.

Specifically, when skin or finger touches the outer case 1 of the electronic device T, an infrared heat energy generated from the skin or finger passes into the electronic device T through the opening 10 of the outer case 1, the filter structure 4 only receives an infrared wave generated from the skin or finger passing through and reflects other waves, the thermopile sensor chip 3 receives the filtered infrared heat, and the infrared temperature is then obtained.

Tenth Embodiment

Figure 10:
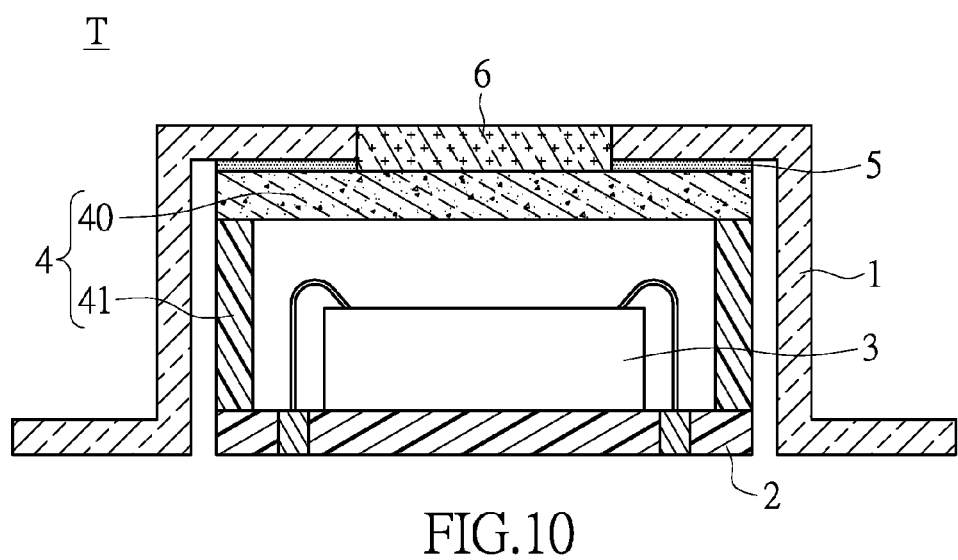
FIG. 10 shows a schematic view of a thermopile module of a tenth embodiment in the instant disclosure.

Please refer to FIG. 10. FIG. 10 shows a schematic view of an electronic device T of a tenth embodiment in the instant disclosure. The structure of the electronic device T of the tenth embodiment in the instant disclosure is similar to that of the ninth embodiment in the instant disclosure.

The electronic device T of the tenth embodiment in the instant disclosure includes an outer case 1, a circuit substrate 2, a thermopile sensor chip 3, a filter structure 4, and a waterproof structure 5. The outer case 1 has an opening 10. The circuit substrate 2 is disposed inside the outer case 1. The thermopile sensor chip 3 is disposed on the circuit substrate 2. The filter structure 4 is disposed above the thermopile sensor chip 3. The filter structure 4 has a filter covering portion 40 and a filter supporting portion 41, the filter covering portion 40 is suspend above the thermopile sensor chip 3 and connected to the waterproof structure 5, and the filter supporting portion 41 is extended downwardly from the filter covering portion 40 to contact the circuit substrate 2 for supporting the filter covering portion 40. The waterproof structure 5 is surroundingly connected between the filter structure 4 and the outer case 1 for sealing up the opening 10 of the outer case 1, wherein the waterproof structure 5 has a through hole 50 for exposing the filter structure 4 and communicated with the opening 10 of the outer case 1.

The difference between the tenth embodiment and the ninth embodiment in this instant disclosure is that, the opening 10 of the outer case 1 and the through hole 50 of the waterproof structure 5 are filled with an infrared passing glue 6. The infrared passing glue 6 is made from a transparent material, when the infrared passing glue 6 is solidified, the infrared passing glue 6 is integrated with the electronic device T, and the infrared passing glue 6 can let an infrared heat energy generated from an ambient environment or an object surface (e.g., skin or finger) passes therethrough. In addition, since the infrared passing glue 6 is integrated with the electronic device T, which can prevent water and dust getting into the electronic device T.

Specifically, when skin or finger touches the infrared passing glue 6 of the outer case 1 of the electronic device T, the infrared heat energy generated from the skin or finger passes into the electronic device T through the infrared passing glue 6, the filter structure 4 only receives the infrared wave generated from the skin or finger passing through and reflects other waves, the thermopile sensor chip 3 receives the filtered infrared heat, and the infrared temperature is then obtained.

Eleventh Embodiment

Figure 11:
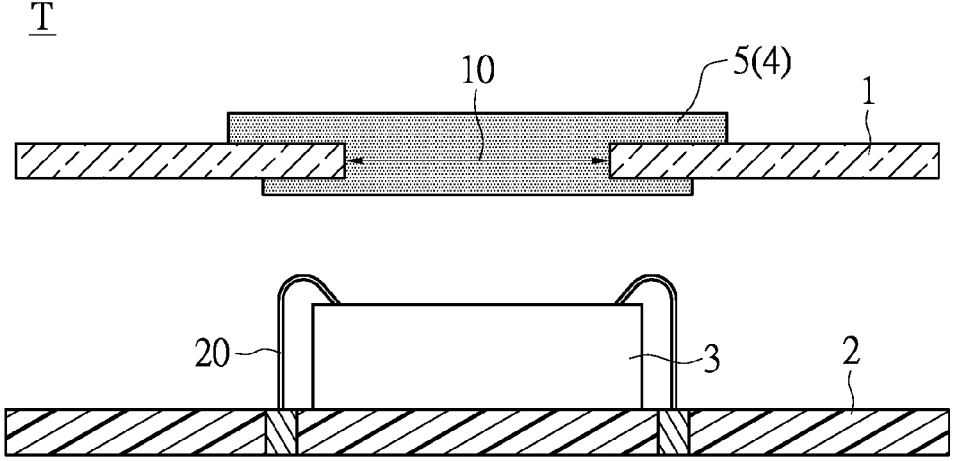
FIG. 11 shows a schematic view of a thermopile module of an eleventh embodiment in the instant disclosure.

Please refer to FIG. 11. FIG. 11 shows a schematic view of an electronic device T of an eleventh embodiment in the instant disclosure. An electronic device T of the eleventh embodiment in the instant disclosure includes an outer case 1, a circuit substrate 2, a thermopile sensor chip 3, and a waterproof structure 5. The outer case 1 has an opening 10. The circuit substrate 2 is disposed inside the outer case 1. The thermopile sensor chip 3 is disposed on the circuit substrate 2, and is electrically connected to the circuit substrate 2 by wire-bonding 20. The waterproof structure 5 is disposed on the outer case 1 for sealing up the opening 10 of the outer case 1, and the waterproof structure 5 is a filter structure 4 which is disposed above the thermopile sensor chip 3 and can only let the infrared wave passing therethrough.

Specifically, when skin or finger touches the waterproof structure 5 of the electronic device T, an infrared heat energy generated from the skin or finger passes into the electronic device T through the waterproof structure 5, since the waterproof structure 5 is a filter structure 4 which is disposed above the thermopile sensor chip 3 and only receives the infrared wave generated from the skin or finger passing through and reflects other waves, the thermopile sensor chip 3 receives the filtered infrared heat, and the infrared temperature is then obtained.

Twelfth Embodiment

Figure 12:
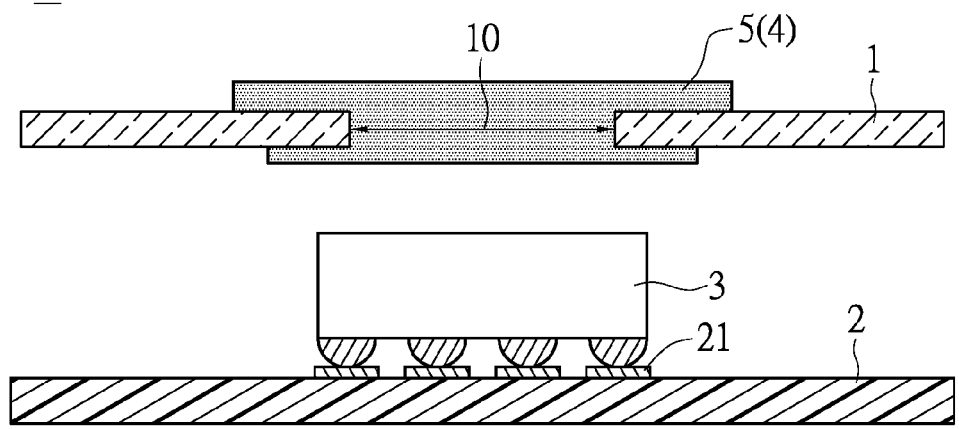
FIG. 12 shows a schematic view of a thermopile module of a twelfth embodiment in the instant disclosure.

Please refer to FIG. 12. FIG. 12 shows a schematic view of an electronic device T of a twelfth embodiment in the instant disclosure. The structure of the electronic device T of the twelfth embodiment in the instant disclosure is similar to that of the eleventh embodiment in the instant disclosure.

The electronic device T of the twelfth embodiment in the instant disclosure includes an outer case 1, a circuit substrate 2, a thermopile sensor chip 3, and a waterproof structure 5. The outer case 1 has an opening 10. The circuit substrate 2 is disposed inside the outer case 1. The thermopile sensor chip 3 is disposed on the circuit substrate 2. The waterproof structure 5 is disposed on the outer case 1 for sealing up the opening 10 of the outer case 1, and the waterproof structure 5 is a filter structure 4 which is disposed above the thermopile sensor chip 3 and can only let the infrared wave passing therethrough.

The difference between the twelfth embodiment and the eleventh embodiment in this instant disclosure is that, the thermopile sensor chip 3 is electrically connected to the circuit substrate 2 by flip-chip bonding 21.

Specifically, when skin or finger touches the waterproof structure 5 of the electronic device T, an infrared heat energy generated from the skin or finger passes into the electronic device T through the waterproof structure 5, since the waterproof structure 5 is a filter structure 4 which is disposed above the thermopile sensor chip 3 and only receives the infrared wave generated from the skin or finger passing through and reflects other waves, the thermopile sensor chip 3 receives the filtered infrared heat, and the infrared temperature is then obtained.

Thirteenth Embodiment

Figure 13:
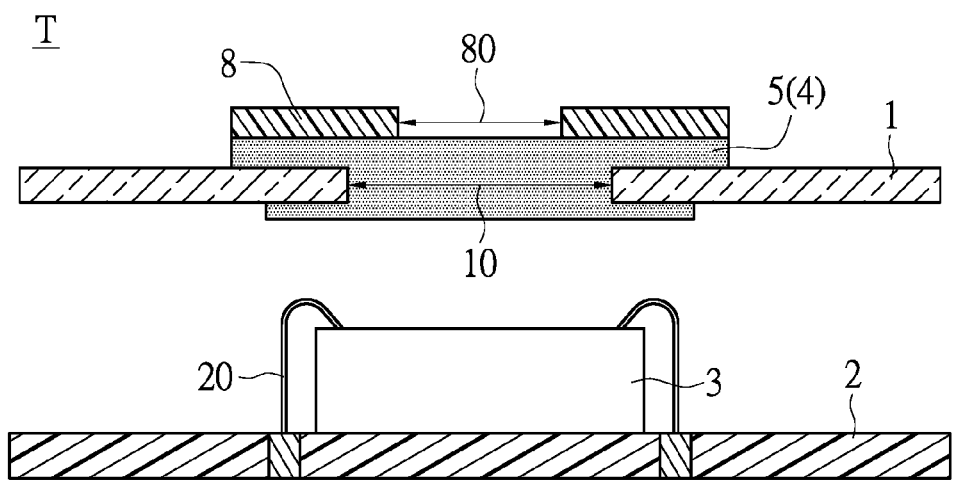
FIG. 13 shows a schematic view of a thermopile module of a thirteenth embodiment in the instant disclosure.

Please refer to FIG. 13. FIG. 13 shows a schematic view of an electronic device T of a thirteenth embodiment in the instant disclosure. The structure of the electronic device T of the thirteenth embodiment in the instant disclosure is similar to that of the eleventh embodiment in the instant disclosure.

The electronic device T of the thirteenth embodiment in the instant disclosure includes an outer case 1, a circuit substrate 2, a thermopile sensor chip 3, and a waterproof structure 5. The outer case 1 has an opening 10. The circuit substrate 2 is disposed inside the outer case 1. The thermopile sensor chip 3 is disposed on the circuit substrate 2, and is electrically connected to the circuit substrate 2 by wire-bonding 20. The waterproof structure 5 is disposed on the outer case 1 for sealing up the opening 10 of the outer case 1, and the waterproof structure 5 is a filter structure 4 which is disposed above the thermopile sensor chip 3 and can only let the infrared wave passing therethrough.

The difference between the thirteenth embodiment and the eleventh embodiment in this instant disclosure is that, the electronic device T further includes an isolation structure 8 surroundingly connected on the waterproof structure 5 and having an aperture 80 for exposing the waterproof structure 5.

Specifically, when skin or finger touches isolation structure 8 of the electronic device T, an infrared heat energy generated from the skin or finger passes into the electronic device T through the aperture 80, since the waterproof structure 5 is a filter structure 4 which is disposed above the thermopile sensor chip 3 and only receives the infrared wave generated from the skin or finger passing through and reflects other waves, the thermopile sensor chip 3 receives the filtered infrared heat, and the infrared temperature is then obtained.

Fourteenth Embodiment

Figure 14:
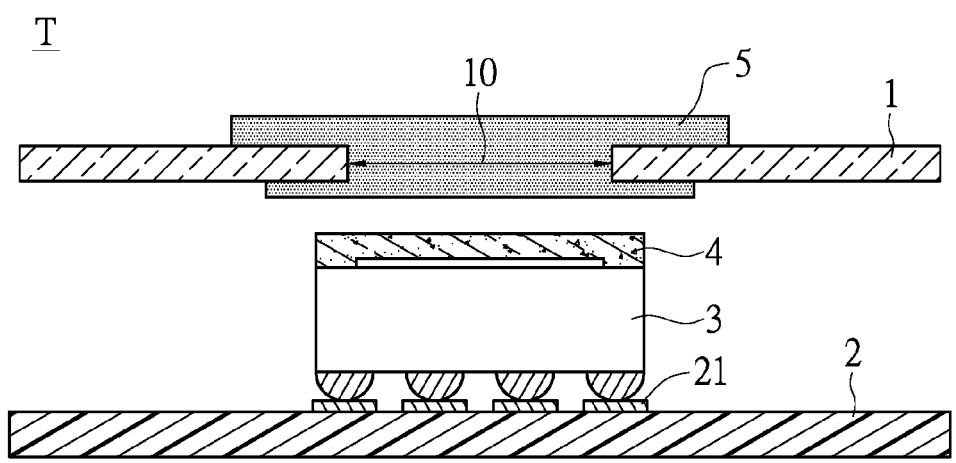
FIG. 14 shows a schematic view of a thermopile module of a fourteenth embodiment in the instant disclosure.

Please refer to FIG. 14. FIG. 14 shows a schematic view of an electronic device T of a fourteenth embodiment in the instant disclosure. The structure of the electronic device T of the fourteenth embodiment in the instant disclosure is similar to that of the twelfth embodiment in the instant disclosure.

The electronic device T of the fourteenth embodiment in the instant disclosure includes an outer case 1, a circuit substrate 2, a thermopile sensor chip 3, and a waterproof structure 5. The outer case 1 has an opening 10. The circuit substrate 2 is disposed inside the outer case 1. The thermopile sensor chip 3 is disposed on the circuit substrate 2, and is electrically connected to the circuit substrate 2 by flip-chip bonding 21. The waterproof structure 5 is disposed on the outer case 1 for sealing up the opening 10 of the outer case 1.

The difference between the fourteenth embodiment and the twelfth embodiment in this instant disclosure is that, the electronic device T further includes a filter structure 4 disposed on the thermopile sensor chip 3, and the waterproof structure 5 is an infrared pass structure which is disposed above the filter structure 4 and is made from a transparent material.

Specifically, when skin or finger touches the waterproof structure 5 of electronic device T, the infrared heat energy generated from the skin or finger passes into the electronic device T through the waterproof structure 5, since the waterproof structure 5 is an infrared pass structure which can let the infrared heat energy passing therethrough, the filter structure 4 only receives the infrared wave obtained from the waterproof structure 5 and reflects other waves, the thermopile sensor chip 3 receives the filtered infrared heat, and the infrared temperature is then obtained.

Fifteenth Embodiment

Figure 15:
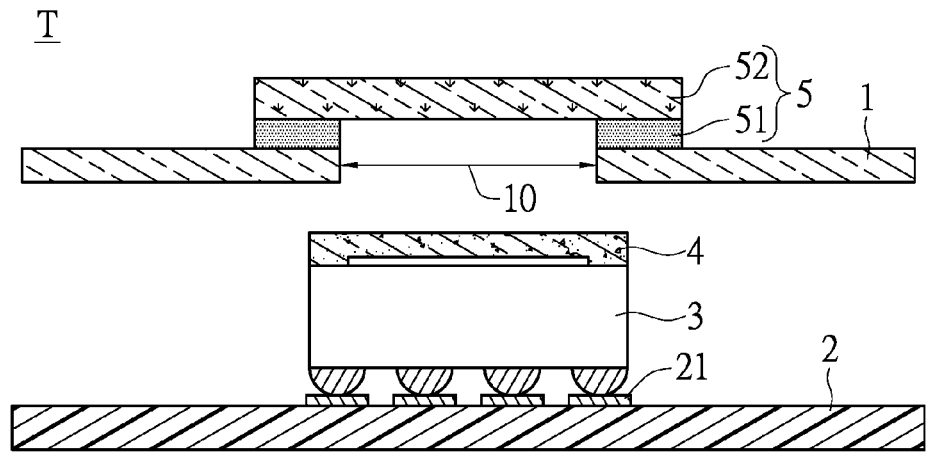
FIG. 15 shows a schematic view of a thermopile module of a fifteenth embodiment in the instant disclosure.

Please refer to FIG. 15. FIG. 15 shows a schematic view of an electronic device T of a fifteenth embodiment in the instant disclosure. The structure of the electronic device T of the fifteenth embodiment in the instant disclosure is similar to that of the fourteenth embodiment in the instant disclosure.

The electronic device T of the fifteenth embodiment in the instant disclosure includes an outer case 1, a circuit substrate 2, a thermopile sensor chip 3, a filter structure 4, and a waterproof structure 5. The outer case 1 has an opening 10. The circuit substrate 2 is disposed inside the outer case 1. The thermopile sensor chip 3 is disposed on the circuit substrate 2, and is electrically connected to the circuit substrate 2 by flip-chip bonding 21. The filter structure 4 is disposed on the thermopile sensor chip 3. The waterproof structure 5 is disposed on the outer case 1 for sealing up the opening 10 of the outer case 1, and the waterproof structure 5 is an infrared pass structure which is disposed above the filter structure 4 and is made from a transparent material.

The difference between the fifteenth embodiment and the fourteenth embodiment in this instant disclosure is that, the waterproof structure 5 includes a first waterproofing element 51 which is an waterproofing glue and a second waterproofing element 52 which is an infrared pass structure, the first waterproofing element 51 is surroundingly connected on the outer case 1 and has a first through hole 510 communicated with the opening 10 of the outer case 1, and the second waterproofing element 52 is disposed on the first waterproofing element 51 for sealing up the opening of the outer case.

Specifically, when skin or finger touches the waterproof structure 5 of electronic device T, the infrared heat energy generated from the skin or finger passes into the electronic device T through the waterproof structure 5, since the waterproof structure 5 is an infrared pass structure which can let the infrared heat energy passing therethrough, the filter structure 4 only receives the infrared wave obtained from the waterproof structure 5 and reflects other waves, the thermopile sensor chip 3 receives the filtered infrared heat, and the infrared temperature is then obtained.

Sixteenth Embodiment

Figure 16:
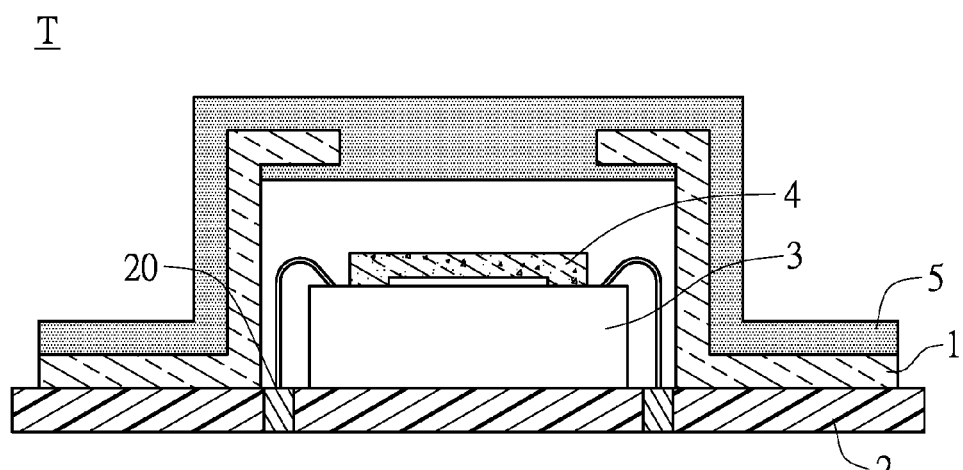
FIG. 16 shows a schematic view of a thermopile module of a sixteenth embodiment in the instant disclosure.

Please refer to FIG. 16. FIG. 16 shows a schematic view of an electronic device T of a sixteenth embodiment in the instant disclosure. The structure of the electronic device T of the sixteenth embodiment in the instant disclosure is similar to that of the fourteenth embodiment in the instant disclosure.

The electronic device T of the sixteenth embodiment in the instant disclosure includes an outer case 1, a circuit substrate 2, a thermopile sensor chip 3, a filter structure 4, and a waterproof structure 5. The outer case 1 has an opening 10. The circuit substrate 2 is disposed inside the outer case 1. The thermopile sensor chip 3 is disposed on the circuit substrate 2. The filter structure 4 is disposed on the thermopile sensor chip 3. The waterproof structure 5 is disposed on the outer case 1 for sealing up the opening 10 of the outer case 1, and the waterproof structure 5 is an infrared pass structure which is disposed above the filter structure 4 and is made from a transparent material which can let an infrared passing therethrough.

The difference between the sixteenth embodiment and the eleventh embodiment in this instant disclosure is that, the outer case 1 is covered with the waterproof structure 5 which is an infrared pass structure. The thermopile sensor chip 3 is electrically connected to the circuit substrate 2 by wire-bonding 20.

Specifically, when skin or finger touches the waterproof structure 5 of electronic device T, the infrared heat energy generated from the skin or finger passes into the electronic device T through the waterproof structure 5, since the waterproof structure 5 is an infrared pass structure which can let the infrared heat energy passing therethrough, the filter structure 4 only receives the infrared wave obtained from the waterproof structure 5 and reflects other waves, the thermopile sensor chip 3 receives the filtered infrared heat, and the infrared temperature is then obtained.

Seventeenth Embodiment

Figure 17:
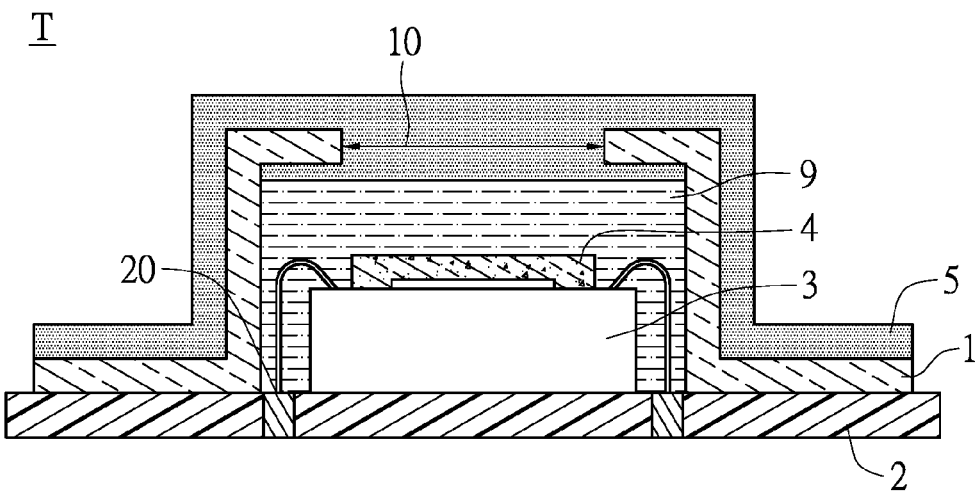
FIG. 17 shows a schematic view of a thermopile module of a seventeenth embodiment in the instant disclosure.

Please refer to FIG. 17. FIG. 17 shows a schematic view of an electronic device T of a seventeenth embodiment in the instant disclosure. The structure of the electronic device T of the seventeenth embodiment in the instant disclosure is similar to that of the sixteenth embodiment in the instant disclosure.

The electronic device T of the seventeenth embodiment in the instant disclosure includes an outer case 1, a circuit substrate 2, a thermopile sensor chip 3, a filter structure 4, and a waterproof structure 5. The outer case 1 has an opening 10. The circuit substrate 2 is disposed inside the outer case 1. The thermopile sensor chip 3 is disposed on the circuit substrate 2, and is electrically connected to the circuit substrate 2 by wire-bonding 20. The filter structure 4 is disposed on the thermopile sensor chip 3. The waterproof structure 5 is disposed on the outer case 1 for sealing up the opening 10 of the outer case 1, and the waterproof structure 5 is an infrared pass structure which is disposed above the filter structure 4 and is made from a transparent material which can let an infrared passing therethrough. The outer case 1 is covered with the waterproof structure 5 which is an infrared pass structure.

The difference between the seventeenth embodiment and the sixteenth embodiment in this instant disclosure is that, the electronic device T further includes a dust preventing structure 9, wherein the dust preventing structure 9 is disposed on the circuit substrate 2 for encapsulating the thermopile sensor chip 3 and the filter structure 4. Since the thermopile sensor chip 3 and the filter structure 4 are completely covered by the waterproof structure 5 and the dust preventing structure 9, which can prevent the moisture or particles getting into the electronic device T. In addition, the material of the dust preventing structure 9 is transparent, such that the infrared can pass therethrough.

Specifically, when skin or finger touches the waterproof structure 5 of electronic device T, the infrared heat energy generated from the skin or finger passes into the electronic device T through the waterproof structure 5, since the waterproof structure 5 is an infrared pass structure, and both of the material of the infrared pass structure and the dust preventing structure 9 are transparent, such that the infrared heat energy can pass therethrough. The filter structure 4 only receives the infrared wave obtained from the waterproof structure 5 and the dust preventing structure 9, and reflects other waves. The thermopile sensor chip 3 receives the filtered infrared heat, and the infrared temperature is then obtained.

Eighteenth Embodiment

Figure 18:
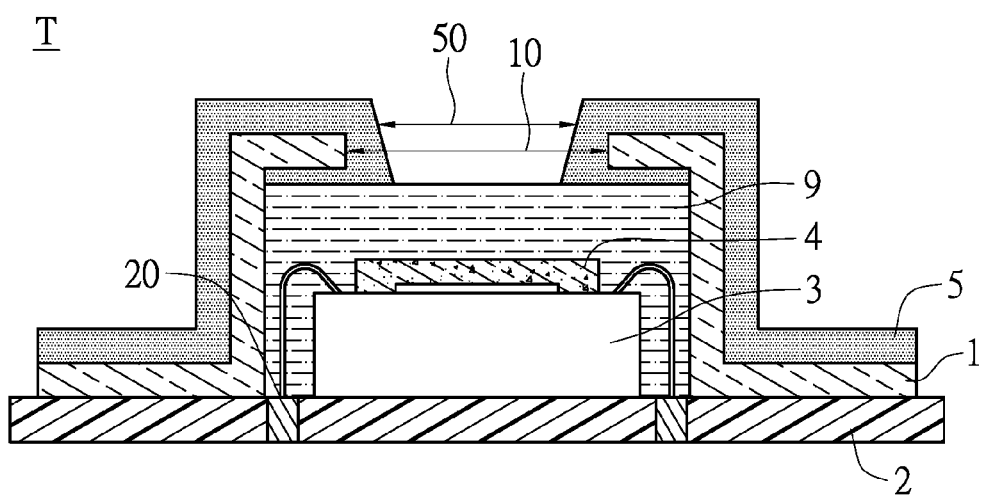
FIG. 18 shows a schematic view of a thermopile module of an eighteenth embodiment in the instant disclosure.

Please refer to FIG. 18. FIG. 18 shows a schematic view of an electronic device T of an eighteenth embodiment in the instant disclosure. The structure of the electronic device T of the eighteenth embodiment in the instant disclosure is similar to that of the seventeenth embodiment in the instant disclosure.

The electronic device T of the eighteenth embodiment in the instant disclosure includes an outer case 1, a circuit substrate 2, a thermopile sensor chip 3, a filter structure 4, a waterproof structure 5, and a dust preventing structure 9. The outer case 1 has an opening 10. The circuit substrate 2 is disposed inside the outer case 1. The thermopile sensor chip 3 is disposed on the circuit substrate 2, and is electrically connected to the circuit substrate 2 by wire-bonding 20. The filter structure 4 is disposed on the thermopile sensor chip 3. The waterproof structure 5 is disposed on the outer case 1 for sealing up the opening 10 of the outer case 1, and the waterproof structure 5 is an infrared pass structure which is disposed above the filter structure 4 and is made from a transparent material which can let an infrared passing therethrough. The outer case 1 is covered with the waterproof structure 5 which is an infrared pass structure. The dust preventing structure 9 is disposed on the circuit substrate 2 for encapsulating the thermopile sensor chip 3 and the filter structure 4. Since the thermopile sensor chip 3 and the filter structure 4 are completely covered by the waterproof structure 5 and the dust preventing structure 9, which can prevent the moisture or particles getting into the electronic device T. In addition, the material of the dust preventing structure 9 is transparent, such that the infrared can pass therethrough.

The difference between the eighteenth embodiment and the seventeenth embodiment in this instant disclosure is that, the waterproof structure 5 has a through hole 50 passing through the opening 10 of the outer case 1 for exposing the dust preventing structure 9.

Specifically, when skin or finger touches the waterproof structure 5 of electronic device T, the infrared heat energy generated from the skin or finger passes into the electronic device T through the through hole 50, since the material of the dust preventing structure 9 is transparent, the infrared heat energy can pass therethrough. The filter structure 4 only receives the infrared wave obtained from the waterproof structure 5 and the dust preventing structure 9, and reflects other waves. The thermopile sensor chip 3 receives the filtered infrared heat, and the infrared temperature is then obtained.

In summary, the benefit of the instant disclosure is that, the thermopile module of this instant disclosure includes a waterproof structure, and has small size which can be used in a wearable device for measuring infrared temperature generated from an ambient environment or an object surface (e.g., skin or finger). Since the thermopile module of this instant disclosure including the waterproof structure, it can avoid water getting into the thermopile module, so as to prevent the wearable device getting rusty due to moisture. In addition, infrared passing glue and the dust preventing structure can avoid the dust particles getting into the thermopile module, so as to prevent the wearable device being damaged due to dust particles.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. An electronic device, comprising:
   an outer case having an opening;
   a circuit substrate disposed inside the outer case;
   a thermopile sensor chip disposed on the circuit substrate;
   a filter structure disposed above the thermopile sensor chip;
   a waterproof structure surroundingly connected between the filter structure and the outer case for sealing up the opening of the outer case;
   wherein the waterproof structure includes a first waterproofing element, a second waterproofing element, and a support structure, the first waterproofing element is surroundingly connected onto the filter structure, the second waterproofing element is surroundingly connected onto the outer case, the support structure is disposed between the first waterproofing element and the second waterproofing element, and the support structure has a first support portion connected between the first waterproofing element and the second waterproofing element and a second support portion extended downwardly from the first support portion to contact the circuit substrate for supporting the second waterproofing element;
   wherein the first waterproofing element has a first through hole, the second waterproofing element has a second through hole communicated with the opening of the outer case, the first support portion has a third through hole communicated between the first through hole and the second through hole, and the opening of the outer case and the first, the second, and the third through holes of the waterproof structure are filled with an infrared passing glue.

2. The electronic device as claimed in claim 1, wherein the thermopile sensor chip is electrically connected to the circuit substrate by wire-bonding or flip-chip bonding.

3. The electronic device as claimed in claim 1, wherein the waterproof structure has a through hole for exposing the filter structure and communicated with the opening of the outer case.

4. The electronic device as claimed in claim 3, wherein the opening of the outer case and the through hole of the waterproof structure are filled with an infrared passing glue.

5. The electronic device as claimed in claim 3, wherein the filter structure has a filter covering portion and a filter supporting portion, the filter covering portion is suspended above the thermopile sensor chip and connected to the waterproof structure, and the filter supporting portion is extended downwardly from the filter covering portion to contact the circuit substrate for supporting the filter covering portion.

6. The electronic device as claimed in claim 3, further comprising a support structure disposed between the circuit substrate and the waterproof structure for supporting the waterproof structure.

7. The electronic device as claimed in claim 6, wherein the opening of the outer case and the through hole of the waterproof structure are filled with an infrared passing glue.

8. The electronic device as claimed in claim 1, wherein the waterproof structure disposed on the circuit substrate for encapsulating the thermopile sensor chip and the filter structure.

9. The electronic device as claimed in claim 3, wherein the filter structure has a filter covering portion and a filter supporting portion, the filter covering portion is suspend above the thermopile sensor chip and connected to the waterproof structure, and the filter supporting portion is extended downwardly from the filter covering portion to contact the circuit substrate for supporting the filter covering portion.

10. The electronic device as claimed in claim 9, wherein the opening of the outer case and the through hole of the waterproof structure are filled with an infrared passing glue.

11. A electronic device, comprising:
an outer case having an opening;
a circuit substrate disposed inside the outer case;
a thermopile sensor chip disposed on the circuit substrate; and
a waterproof structure disposed on the outer case for sealing up the opening of the outer case;
wherein the waterproof structure includes a first waterproofing element which is an waterproofing glue and a second waterproofing element which is an infrared pass structure, the first waterproofing element is surroundingly connected on the outer case, and the second waterproofing element is disposed on the first waterproofing element for sealing up the opening of the outer case.

12. The electronic device as claimed in claim 11, wherein the thermopile sensor chip is electrically connected to the circuit substrate by wire-bonding or flip-chip bonding.

13. The electronic device as claimed in claim 11, wherein the waterproof structure is a filter structure disposed above the thermopile sensor chip.

14. The electronic device as claimed in claim 13, further comprising an isolation structure surroundingly connected onto the filter structure, and the isolation structure having an aperture for exposing the filter structure.

15. The electronic device as claimed in claim 11, further comprising a filter structure disposed on the thermopile sensor chip.

16. The electronic device as claimed in claim 15, wherein the waterproof structure is an infrared pass structure disposed above the filter structure.

17. The electronic device as claimed in claim 11, wherein the first waterproofing element has a through hole communicated with the opening of the outer case.

18. The electronic device as claimed in claim 11, wherein the outer case is covered with the waterproof structure which is an infrared pass structure.

19. The electronic device as claimed in claim 18, further comprising a dust preventing structure, wherein the dust preventing structure is disposed on the circuit substrate for encapsulating the thermopile sensor chip and a filter structure.

20. The electronic device as claimed in claim 18, wherein the waterproof structure has a through hole passing through the opening of the outer case for exposing a dust preventing structure.

21. A electronic device, comprising:
an outer case having an opening;
a circuit substrate disposed inside the outer case;
a thermopile sensor chip disposed on the circuit substrate; and
a waterproof structure disposed on the outer case for sealing up the opening of the outer case;
wherein the outer case is covered with the waterproof structure which is an infrared pass structure.

22. A electronic device, comprising:
an outer case having an opening;
a circuit substrate disposed inside the outer case;
a thermopile sensor chip disposed on the circuit substrate;
a waterproof structure disposed on the outer case for sealing up the opening of the outer case; and
a dust preventing structure disposed on the circuit substrate for encapsulating the thermopile sensor chip and a filter structure.

23. A electronic device, comprising:
an outer case having an opening;
a circuit substrate disposed inside the outer case;
a thermopile sensor chip disposed on the circuit substrate; and
a waterproof structure disposed on the outer case for sealing up the opening of the outer case;
wherein the waterproof structure has a through hole passing through the opening of the outer case for exposing a dust preventing structure.

* * * * *